US007388485B1

(12) United States Patent
Shen

(10) Patent No.: US 7,388,485 B1
(45) Date of Patent: Jun. 17, 2008

(54) ANTI-THEFT DEVICE FOR DOOR OR WINDOW

(76) Inventor: Hsieh Ho Shen, No. 27, Hueijou Street, Jonli City, Taoyuan Hsien 32089 (TW)

( * ) Notice: Subject to any disclaimer, the term of this patent is extended or adjusted under 35 U.S.C. 154(b) by 116 days.

(21) Appl. No.: 11/397,869

(22) Filed: Apr. 4, 2006

(51) Int. Cl.
*G08B 13/00* (2006.01)
*E05G 1/10* (2006.01)
*E05G 1/12* (2006.01)
*B60R 25/00* (2006.01)

(52) U.S. Cl. .............. 340/541; 340/691.7; 340/426.26; 109/20; 109/29; 109/31

(58) Field of Classification Search ................ 340/541, 340/691.7, 426.26; 109/20, 29, 31
See application file for complete search history.

(56) References Cited

U.S. PATENT DOCUMENTS

| | | | | |
|---|---|---|---|---|
| 3,915,103 | A * | 10/1975 | Rupert et al. | 109/2 |
| 4,958,142 | A * | 9/1990 | Sayers | 340/426.26 |
| 4,996,521 | A * | 2/1991 | Hollow | 340/691.7 |
| 5,311,166 | A * | 5/1994 | Frye | 340/541 |
| 5,394,139 | A * | 2/1995 | Dards | 340/541 |
| 5,402,000 | A * | 3/1995 | Owens, II | 340/545.1 |
| 5,424,712 | A * | 6/1995 | Rosenberger | 340/426.26 |
| 5,493,268 | A * | 2/1996 | Lewis et al. | 340/426.26 |
| 5,655,461 | A * | 8/1997 | Gilbert | 109/20 |
| 5,796,330 | A * | 8/1998 | Vinette | 340/426.26 |
| 5,845,433 | A | 12/1998 | Walsh | 49/383 |
| 5,960,586 | A | 10/1999 | Chen | 47/40 |
| 6,074,085 | A * | 6/2000 | Scarpa et al. | 366/101 |
| 6,094,135 | A * | 7/2000 | Sugimoto et al. | 340/541 |
| 6,696,928 | B1 * | 2/2004 | Boveja et al. | 340/426.12 |
| 2006/0086348 | A1 * | 4/2006 | Song et al. | 124/56 |

FOREIGN PATENT DOCUMENTS

JP 2004272407 A * 9/2004

* cited by examiner

*Primary Examiner*—Jeff Hofsass
*Assistant Examiner*—Anne V. Lai
(74) *Attorney, Agent, or Firm*—Charles E. Baxley

(57) ABSTRACT

An anti-theft device includes a sensing device for attaching to an entrance of a house building and for sensing whether the entrance of the house building is pried by an unauthorized person or not, and a counterattacking device for counterattacking the unauthorized person when the unauthorized person breaking the entrance of the house building. One or more containers may receive an attacking agent and a pumping device may pump the attacking agent out of the container via one or more nozzles which may be rotated by a rotating device, an agitating device may agitate the attacking agent received in the container. A receptacle may be attached to the house building for supporting the container.

9 Claims, 3 Drawing Sheets

ANTI-THEFT DEVICE FOR DOOR OR WINDOW

BACKGROUND OF THE INVENTION

1. Field of the Invention

The present invention relates to an anti-theft device for an entrance of a house building, and more particularly to an anti-theft device for attaching to a house building and disposed close to or above an entrance of the house building, and having a striking back or counterattacking device for counterattacking the unauthorized persons or thefts who tried to break into the house building.

2. Description of the Prior Art

Typical anti-theft devices for windows or doors comprise a door frame attached to a window or door of a house building for protecting the window or door and for preventing the window or door from being pried by unauthorized persons or thefts, and thus for preventing the unauthorized persons or thefts from entering into the house building.

For example, U.S. Pat. No. 5,845,433 to Walsh discloses one of the typical anti-theft devices for framed door and also comprises a first member for mounting to the interior surface of the door frame, and a second member for mounting to the interior surface of the door, and the first and the second members are arranged for pivotal movement away from each other when the door is opened, and into interlocking association when the door is closed in the frame to resist attempts to pry the door outward from the frame.

However, normally, the typical anti-theft devices for the framed doors or windows may only be used to defend or to protect the window or the door from being pried by the unauthorized persons or thefts only, but have no counteroffensive or striking back or counterattacking device for counterattacking the unauthorized persons or thefts who tried to break into the house building.

U.S. Pat. No. 5,960,586 to Chen discloses another typical anti-theft device for door or window, and comprising a flower planter railing, a patterned grill, and a weather-shielding canopy making up the structure of a multi-purpose anti-theft window mechanism.

However, similarly, the typical anti-theft devices for the doors or windows may only be used to defend or to protect the window or the door from being pried by the unauthorized persons or thefts only, but have no counteroffensive or striking back or counterattacking device for counterattacking the unauthorized persons or thefts who tried to break into the house building.

The present invention has arisen to mitigate and/or obviate the afore-described disadvantages of the conventional anti-theft devices for windows or doors.

SUMMARY OF THE INVENTION

The primary objective of the present invention is to provide an anti-theft device for attaching to a house building and disposed close to or above an entrance of the house building, and having a striking back or counterattacking device for counterattacking the unauthorized persons or thefts who tried to break into the house building.

In accordance with one aspect of the invention, there is provided an anti-theft device comprising a sensing device for attaching to an entrance of a house building and for sensing whether the entrance of the house building is pried by an unauthorized person or not, and a counterattacking device for counterattacking the unauthorized person when the unauthorized person breaking the entrance of the house building.

The counterattacking device includes at least one container disposed close to the entrance of the house building for receiving an attacking agent therein. The counterattacking device includes a pumping device coupled to the container for pumping the attacking agent out of the container. One or more nozzles are coupled to the pumping device for allowing the attacking agent to flow out of the nozzle.

A rotating device is coupled to the nozzle for rotating the nozzle. The rotating device includes a rotatable shaft for supporting the nozzle, and a motor coupled to the shaft for rotating the nozzle and the shaft. The rotating device includes a wheel attached to the shaft, an eccentric member attached to the motor, and a link coupled between the eccentric member and the wheel.

A receptacle is provided for attaching to the house building and for disposing close to the entrance of the house building and for supporting the container, the receptacle includes an opening formed therein and aligned with the nozzle for allowing the attacking agent to be sprayed out through the nozzle and through the opening of the receptacle.

The container includes an agitating device for agitating the attacking agent received in the container. The agitating device includes a pipe disposed in the container for supplying air into the container to agitate the attacking agent.

The pipe includes a number of orifices formed therein for supplying the air into the container. The agitating device includes a pumping device coupled to the pipe. The agitating device includes a hose coupling the pumping device to the container for circulating the attacking agent.

The counterattacking device includes a second container disposed close to the entrance of the house building for receiving an attacking agent therein. The counterattacking device includes a valve device coupled between the second container and the container for communicating the second container and the container with each other. A check valve is coupled between the valve device and the second container and the container.

One or more buzzers are attached to the receptacle and coupled to the sensing device for selectively generating a warning sound, and one or more warning light generators are attached to the receptacle and coupled to the sensing device for selectively generating a warning light.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
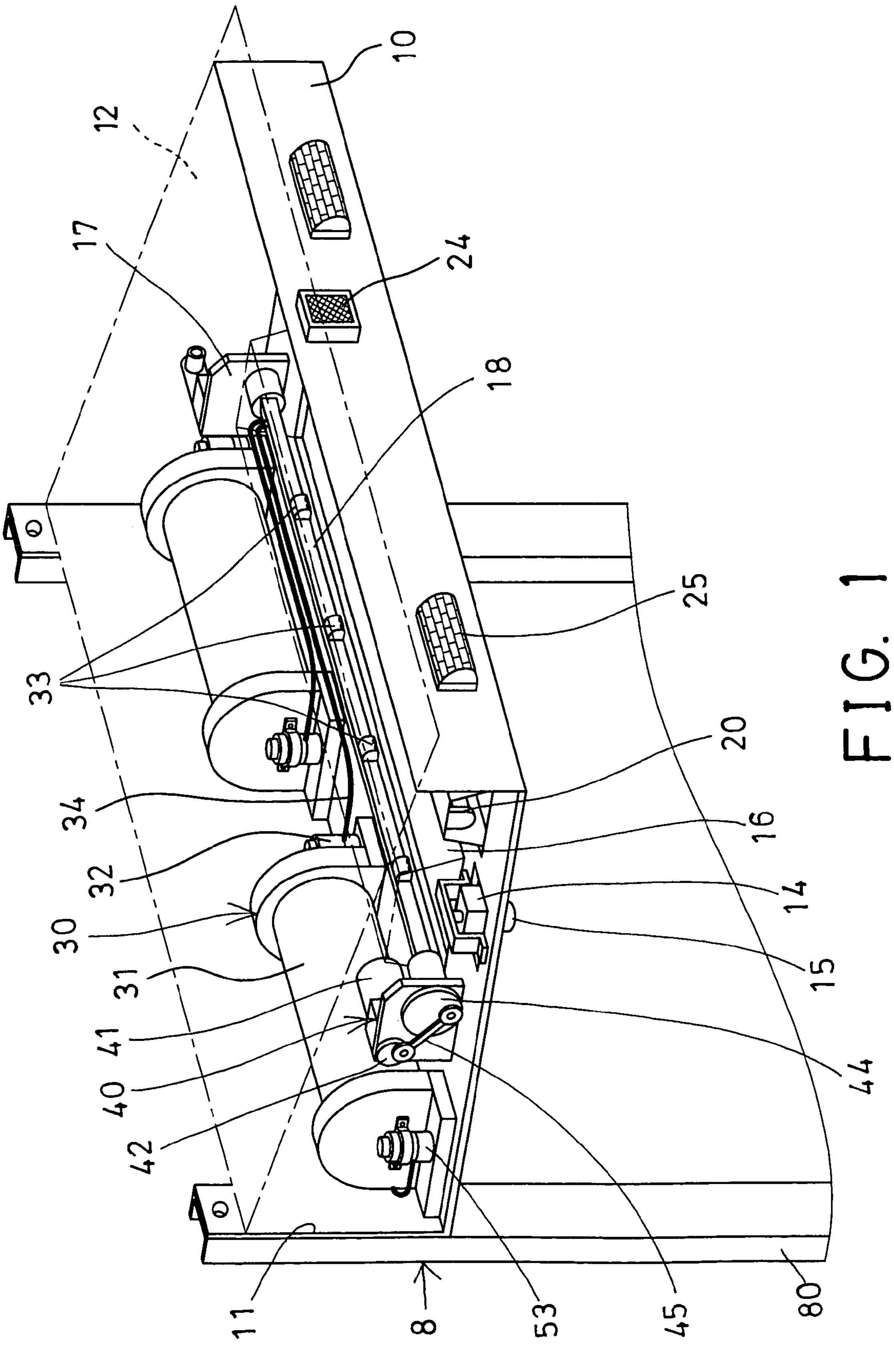
FIG. 1 is a partial perspective view of an anti-theft device in accordance with the present invention.

Referring to the drawings, and initially to FIGS. 1-3, an anti-theft device 1 in accordance with the present invention comprises a body or receptacle 10 for attaching to a house building 8, and preferably disposed close to or disposed above an opening or entrance 80 of the house building 8, such as the window or the door of the house building 8, the receptacle 10 includes a hollow chamber 11 formed therein for receiving various parts or elements which will be discussed hereinafter, and preferably includes a cover or shield 12 attached or disposed on top of the receptacle 10 for covering or shielding the chamber 11 of the receptacle 10 and for protecting the parts or elements received in the chamber 11 of the receptacle 10.

The anti-theft device 1 in accordance with the present invention is to provide a counteroffensive or striking back or counterattacking device 30 for counterattacking the unauthorized persons or thefts who tried to break through the entrance 80 of the house building 8 and who tried to enter into the house building 8. The anti-theft device 1 comprises one or more detectors 14, such as infrared detectors 14 for generating and emitting infrared rays outwardly to detect whether an unauthorized person or theft goes or moves toward or close to the entrance 80 of the house building 8 or not.

For example, one of the detectors 14 may be arranged or used to detect whether an unauthorized person or theft goes or moves toward or close to the entrance 80 of the house building 8 within a distance ranging between 1~3 m or not. One or more light devices 20 may be attached to the receptacle 10 and facing downwardly and/or sidewise and/or forwardly for generating and emitting lights to light the unauthorized person or theft, and/or to generate a warning light when the unauthorized person or theft has moved toward or close to the entrance 80 of the house building 8 within a distance ranging between 1~3 m.

The other detector 14 may be arranged or used to detect whether an unauthorized person or theft goes or moves toward or close to the entrance 80 of the house building 8 within a distance ranging between 60~100 cm or not. One or more camera devices (not shown), such as charge couple devices may be attached to the receptacle 10 and facing downwardly and/or sidewise and/or forwardly for taping or recording the movement or the action of the unauthorized person or theft. The camera devices may be actuated or operated by either or both of the detectors 14 to tape or to record the environment of the house building 8 or to record the unauthorized person or theft who moves toward or breaks or try to break the entrance 80 of the house building 8.

It is preferable that the detectors 14 may detect the temperature of the human body, for actuating the camera devices only when human or people come close to the entrance 80 of the house building 8, and thus for preventing the camera devices from being actuated or operated by the other objects. It is preferable that a hood 15 is further provided and attached to the receptacle 10 and disposed below the detector 14 for refracting or expanding the light and for suitably lighting the unauthorized person or theft who has moved toward or close to the entrance 80 of the house building 8 or who tried to break through the entrance 80 of the house building 8. The camera devices and the detectors 14 have been disclosed and claimed in a co-pending U.S. patent application and will not be described in further details.

The anti-theft device 1 further includes one or more sensing devices or switches 22 (FIG. 2), such as micro-switches 22, or vibrator switches 22 attached to such as the entrance 80 of the house building 8, for detecting or sensing whether the entrance 80 of the house building 8 is pried or broken or damaged or attacked by any unauthorized person or theft or not. The switches or sensing devices 22 may be coupled to the counterattacking device 30 with such as electric wires or cables 23 for actuating or operating the counterattacking device 30 to counterattack the unauthorized person or theft when the unauthorized person or theft pries or breaks or damages the entrance 80 of the house building 8. The switches or sensing devices 22 may also be coupled to other safety or security systems to notify the security people or the guards or the police to come to arrest the unauthorized person or theft. The switches or sensing devices 22 may be the solenoid devices for latching or locking the window or the door or the entrance 80 of the house building 8, or may be the magnetic card or finger print identifying security system.

One or more noise generators or buzzers 24 may further be provided and attached to the receptacle 10, such as attached to the front portion of the receptacle 10 for generating noises or warning sounds when the unauthorized person or theft pries or breaks or damages the entrance 80 of the house building 8. One or more warning light generators 25 may further be provided and attached to the receptacle 10, such as attached to the front portion of the receptacle 10 for generating such as flash lights or warning lights when the unauthorized person or theft pries or breaks or damages the entrance 80 of the house building 8. The noise generators or buzzers 24 and the warning light generators 25 may also be coupled to the switches or sensing devices 22 for being actuated or operated by the switches or sensing devices 22, for example.

One example of the counterattacking device 30 includes one or more containers 31 disposed or received in the chamber 11 of the receptacle 10 or directly disposed close to or disposed above the entrance 80 of the house building 8 for receiving various attacking objects or agents, such as bio-chemical products, dying or coloring agents, pungent or hot agents or powders, allergic solutions, stench agents, or other liquids or fluids or solutions or powders, for counterattacking the unauthorized person or theft when the unauthorized person or theft pries or breaks or damages the entrance 80 of the house building 8. One or more pumps or pumping devices 32 may be coupled to the containers 31, and coupled to one or more spraying heads or nozzles 33 with one or more manifolds 34, for selectively pumping the attacking agents out of the containers 31 through the nozzles 33 to counterattack the unauthorized person or theft.

Figure 4:
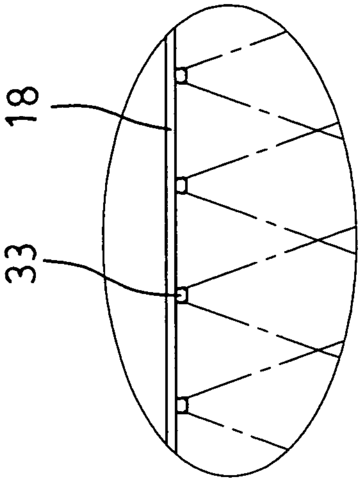
FIG. 4 is an enlarged partial plan schematic view of the anti-theft device.

For example, the receptacle 10 includes an opening 16 formed in the bottom portion thereof and aligned with the nozzles 33 for allowing the attacking agents to be sprayed out through the nozzles 33 and through the opening 16 of the receptacle 10 to counterattack the unauthorized person or theft. It is preferable that the receptacle 10 further includes one or more fences or supports 17 disposed therein for rotatably supporting a shaft 18 therein, and the shaft 18 is preferably and rotatably supported above the opening 16 of the receptacle 10, to attach or to support the nozzles 33 (FIG. 4), and for allowing the nozzles 33 to be rotated relative to the receptacle 10 to spray the attacking agents toward various directions.

It is preferable that the pumping devices 32 may be controlled to pump the attacking agents intermittently for preventing the attacking agents from being quickly consumed. As shown in FIG. 2, a valve device 35, such as a two-way solenoid valve device 35 may further be provided and coupled between the containers 31 for selectively supplying air into the containers 31 or for communicating the containers 31 with each other, and for preventing the containers 31 from being vacuumed inadvertently. A check valve 36 may further be provided and coupled to the valve device 35 or coupled between the containers 31 and the valve device 35 for allowing air to be selectively supplied into the containers 31 when the valve device 35 has become fail.

A swinging or rotating means or device 40 may be used to rotate the shaft 18 and thus to rotate the nozzles 33 relative to the receptacle 10 to various directions, and thus to spray the attacking agents toward various directions. For example, the rotating device 40 may include a pump or motor 41 attached to one of the fences or supports 17 of the receptacle 10 and includes an eccentric member 42 coupled to the spindle 43 thereof (FIG. 2), a disc or wheel 44 attached or secured onto the shaft 18 and coupled to the eccentric member 42 with a link 45 for allowing the shaft 18 and the nozzles 33 to be rotated relative to the receptacle 10 by the motor 41 with the eccentric member 42 and the wheel 44 and the link 45.

Figure 2:
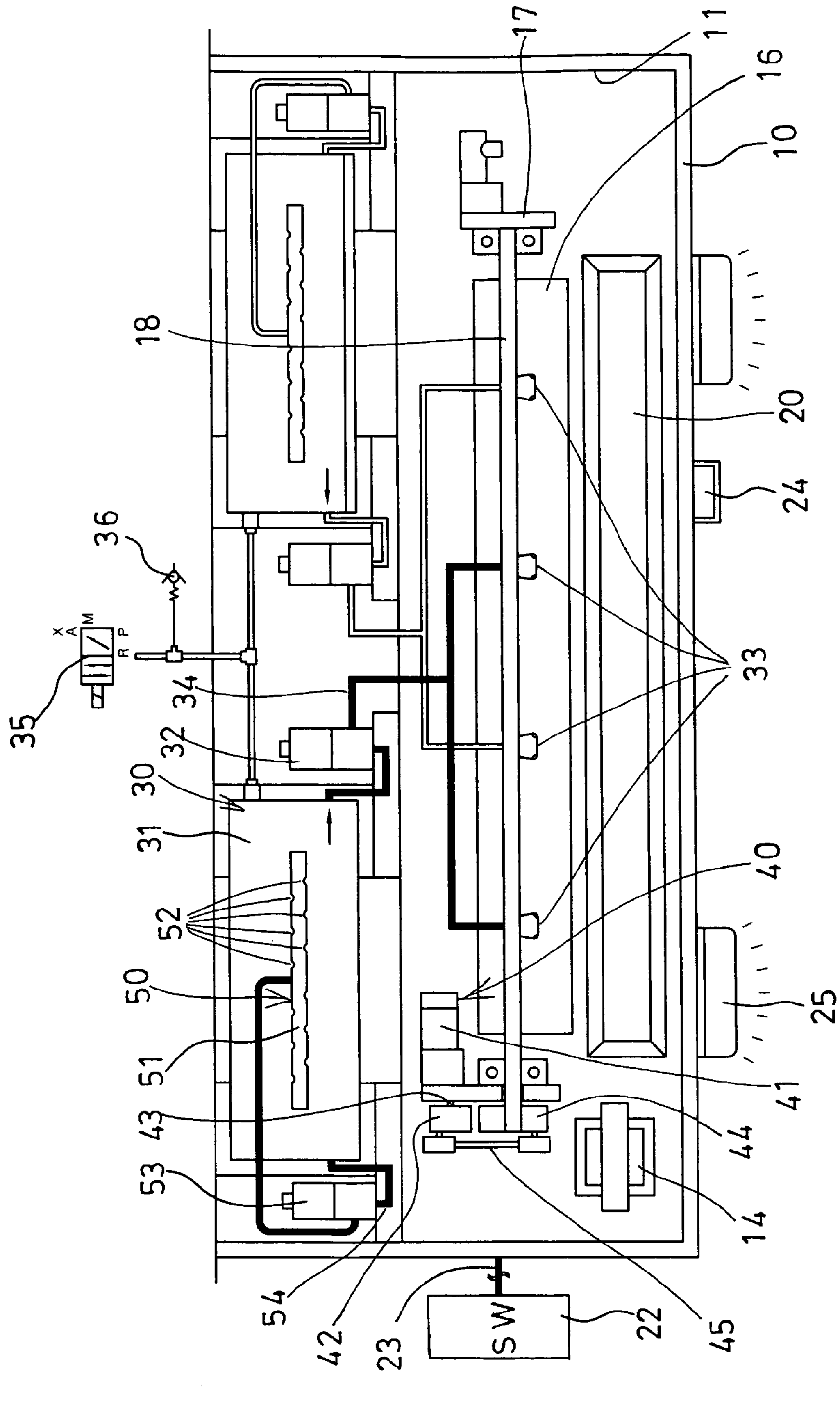
FIG. 2 is a partial upper plan schematic view of the anti-theft device.
Figure 3:
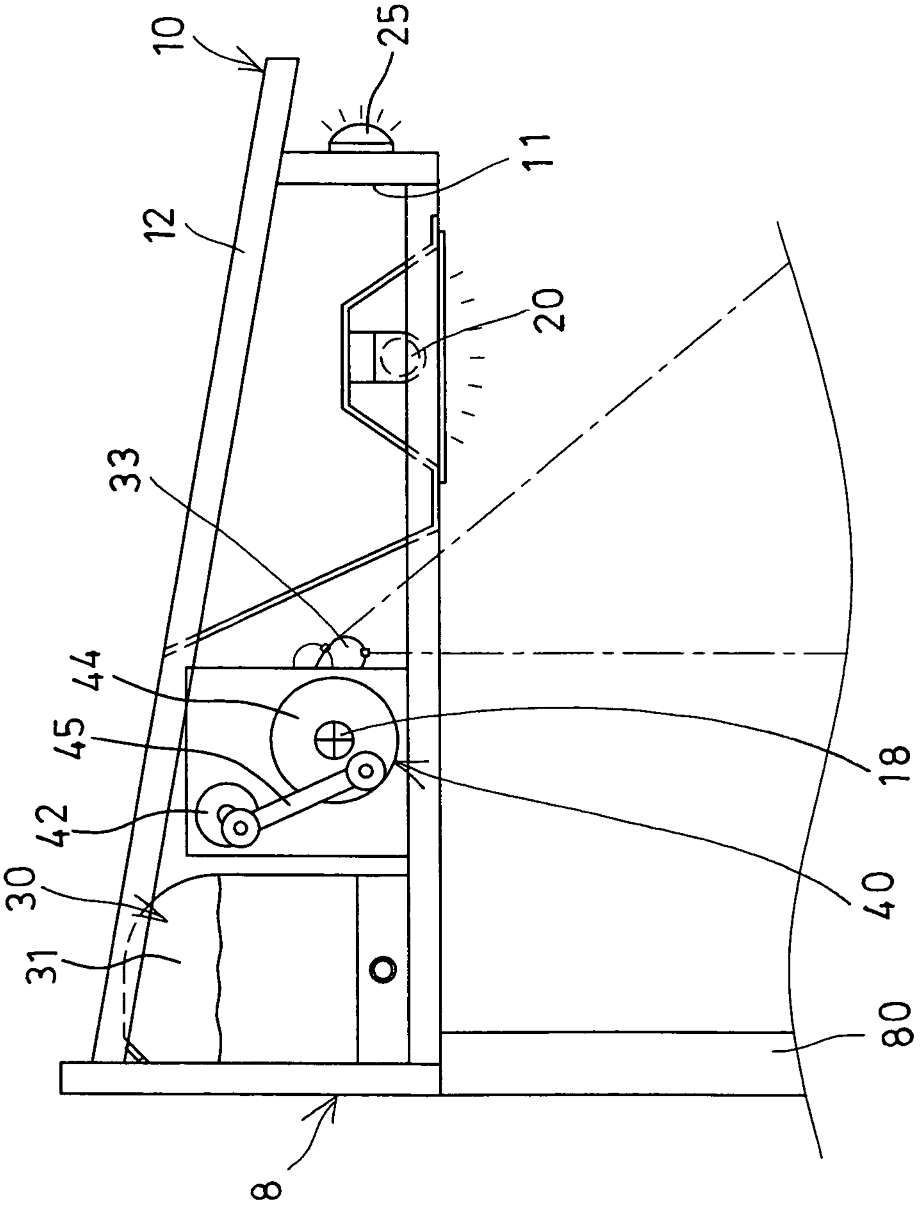
FIG. 3 is a partial side plan schematic view of the anti-theft device.

As shown in FIGS. 2 and 5, an agitating or stirring means or device 50 may further be provided for selectively agitating or stirring the attacking agents received or contained in the containers 31, and for preventing the attacking agents from being solidified. For example, the agitating device 50 includes a tube 51 disposed in each of the containers 31, and the tube 51 includes one or more orifices 52 formed therein for allowing air or other fluids or liquids or agents to be supplied into the containers 31, and a pump or pumping device 53 may be coupled to the tube 51 for selectively pumping the air or other fluids or liquids or attacking agents into the containers 31, in order to selectively agitate or stir the attacking agents and to prevent the attacking agents from being solidified.

The pump or pumping device 53 may further be coupled to the container 31 with a hose 54 for allowing the attacking agents to be selectively circulated through the tube 51, and thus for allowing the attacking agents to be suitably agitated or stirred, and thus for allowing the attacking agents to be maintained in the fluid or movable status for being suitably pumped out through the nozzles 33. It is to be noted that the typical anti-theft devices for the windows or the doors failed to provide any striking back or counterattacking device for counterattacking the thefts who tried to break into the house building. Alternatively, the counterattacking device 30 may be provided to apply high voltage electric energy or other objects or the like to counterattack the thefts.

Accordingly, the anti-theft device in accordance with the present invention may be provided for attaching to a house building and disposed close to or above an entrance of the house building, and having a striking back or counterattacking device for counterattacking the thefts who tried to break into the house building.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An anti-theft device comprising:

a sensing device for attaching to an entrance of a house building and for sensing whether the entrance of the house building is pried by an unauthorized person or not, a receptacle for attaching to the house building and for disposing close to the entrance of the house building, said receptacle including an opening formed therein, a rotatable shaft, at least one nozzle supported on said shaft and rotated in concert with said shaft, at least one container disposed close to the entrance of the house building for receiving an attacking agent therein, and said at least one container being supported in said receptacle, a tube disposed in said at least one container and including a plurality of orifices formed therein for supplying an air into said at least one container to agitate the attacking agent, a first pumping device for pumping the attacking agent out of said at least one container to counterattack the unauthorized person when the unauthorized person breaking the entrance of the house building, said at least one nozzle being aligned with said opening of said receptacle and being coupled to said first pumping device for allowing the attacking agent to flow out of said at least one nozzle and to be sprayed out through said opening of said receptacle, and a motor coupled to said shaft for rotating said at least one nozzle and said shaft.

2. The anti-theft device as claimed in claim 1, wherein said rotating means includes a wheel attached to said shaft, an eccentric member attached to said motor, and a link coupled between said eccentric member and said wheel.

3. The anti-theft device as claimed in claim 1, wherein said agitating means includes a second pumping device coupled to said tube.

4. The anti-theft device as claimed in claim 3, wherein said agitating means includes a hose coupling said second pumping device to said at least one container for circulating the attacking agent.

5. The anti-theft device as claimed in claim 1, wherein a second container is disposed close to the entrance of the house building for receiving an attacking agent therein.

6. The anti-theft device as claimed in claim 5, wherein a valve device is coupled between said second container and said at least one container for communicating said second container and said at least one container with each other.

7. The anti-theft device as claimed in claim 6, wherein a check valve is coupled between said valve device and said second container and said at least one container.

8. The anti-theft device as claimed in claim 1, wherein at least one buzzer is attached to said receptacle and coupled to said sensing device for selectively generating a warning sound.

9. The anti-theft device as claimed in claim 1, wherein at least one warning light generator is attached to said receptacle and coupled to said sensing device for selectively generating a warning light.

* * * * *